Dec. 20, 1938.  S. W. E. ANDERSSON ET AL  2,140,947

THERMOSTATIC CONTROL VALVE

Filed March 31, 1933

INVENTOR.
Sven W. E. Andersson
Ivar Tornkvist
BY
A. Yates Dowell.
ATTORNEY.

Patented Dec. 20, 1938

2,140,947

UNITED STATES PATENT OFFICE 2,140,947

THERMOSTATIC CONTROL VALVE

Sven W. E. Andersson and Ivar Tornkvist, New York, N. Y., assignors, by mesne assignments, to Servel, Inc., Dover, Del., a corporation of Delaware Application March 31, 1933, Serial No. 663,688

8 Claims. (Cl. 236—99)

This invention relates to automatic valves and more particularly to a control valve of a gas burner for absorption type refrigeration apparatus.

There is contemplated especially an absorption refrigeration system of the pressure equalized continuous type. Briefly, in such a system refrigerant vapor is expelled from solution in a generator by heat. The vapor is liquefied in a condenser and the liquid refrigerant conducted to an evaporator where it evaporates by diffusion into an auxiliary gas. The resulting gas mixture is conducted to an absorber where the refrigerant vapor is absorbed into weak solution from which vapor was expelled in the generator. The temperature of the evaporator is controlled by varying distillation in the generator and, when a gas burner is utilized for heating the generator, control is readily provided by a valve in the burner supply line operated by a thermostat responsive to evaporator temperature. Instead of a separate valve in the supply line, the mixing valve of the burner itself may be automtically operated by a control thermostat.

It has been found that even with friction reduced to a minimum and the movement of the thermostat multiplied many times by levers or other means, the sensitivity of the thermostatic valve may still be improved. It has also been found that the sensitivity of the usual device is greatest just when the valve starts to open. An important factor affecting the sensitivity of a thermostatic valve is the characteristic of the spring force that balances the pressure in the thermostatic element exerted by what is referred to as a load spring. In both spiral and lever springs, the sensitivity decreases with displacement so that a thermostatic valve provided with such a spring evidences a decrease in sensitivity upon increase in compression of the load spring.

In accordance with this invention there is provided in a thermostatic device a compensating load spring the sensitivity of which increases with increase in displacement.

Another object of the invention is to provide between the thermostat and valve a simple means for reversing movement within a small space.

Figure 1:
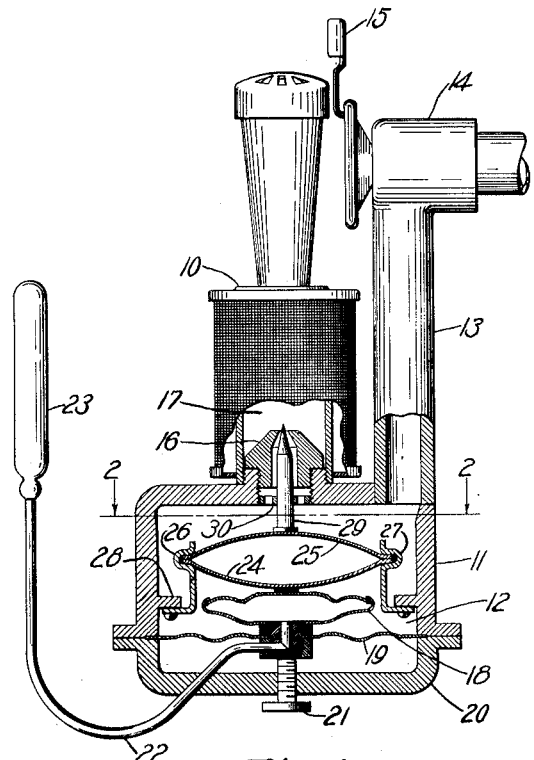
Figure 2:
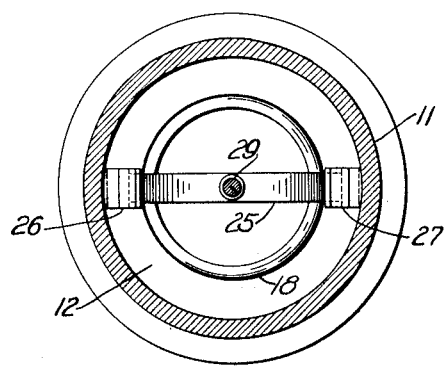

Other objects and advantages will be apparent from the following description taken in connection with the accompanying drawing, in which Fig. 1 shows schematically, partly in vertical section, a thermostatic control valve for a gas burner embodying the invention; and Fig. 2 is a section taken on line 2—2 in Fig. 1.

Referring to the drawing, the gas burner 10 is of a type well known in the art and in itself forms no part of the present invention. The burner is mounted directly on a valve casing 11 enclosing a valve chamber 12. A gas supply line 13 connected to the valve chamber 12 is provided with a safety cut-off valve 14 which is open only when the burner is ignited, the safety valve thermostat being heated from the flame by conduction through a member 15, as well known in the art.

The needle type mixing valve 16 of the burner controls the flow of gas from the valve chamber 12 into the mixing chamber 17. The valve operating thermostat comprises an expansible diaphragm 18 in the valve chamber 12 and which is mounted on a flexible diaphragm 19 which is secured around its edge by a cover 20 for the valve casing 11. The thermostat setting is obtained by a screw 21 which is threaded through the cover 20 and forms an adjustable abutment for the expansible diaphragm 18. The latter is connected through a capillary tube 22 to a sensitive bulb 23, forming an expansible fluid thermostat.

Within the valve chamber 12 are two similar normally straight strips or leaf springs 24 and 25 which are mechanically connected at their ends and resiliently retained in oppositely bowed positions by arms 26 and 27 of stiff spring material which are mounted on lugs 28 on the interior of the valve casing 11. The spring arms 26 and 27 and the bowed spring 24 constitute what is usually referred to as a load spring for the thermostat. The thermostat diaphragm 18 is arranged to exert an upward pressure on the center of the downwardly bowed spring 24 and the valve needle 29 is secured at its lower end to the center of the upwardly bowed spring 25. The valve stem is guided by a spider 30 threaded into the opening from chamber 12 in the valve casing provided for the burner valve 16.

It is contemplated that the device just described will be arranged with the burner in heating relation to the generator of a continuous absorption refrigeration machine and the thermostat bulb 23 positioned in thermal transfer relation with the evaporator or cooling element of the machine. Upon increase in temperature, the thermostat diaphragm 18 expands, displacing the center of the bowed spring 24 upwardly against the action of springs 26 and 27. This movement carries the spring 24 toward its normal straight line or unflexed position rather than away from it as in the usual springs. The nearer spring 24 approaches its straight line position, less will be the force necessary to produce a given displacement. Thus the sensitivity is increased rather than decreased. As the spring 24 is moved upwardly, the large springs 26 and 27 are moved apart by toggle action, allowing the upwardly bowed spring 25 to straighten toward its normal position, carrying the valve needle 29 downwardly to further open the burner valve 16. Thus the movement of the thermostat with respect to the valve is reversed.

It will be obvious that the thermostatic burner valve shown and described herein is only illustrative and many variations will be apparent to one skilled in the art. For instance, instead of the spider 30 for guiding the valve needle 29 the latter may be mounted directly on a flexible diaphragm as disclosed in United States Patent 1,961,325. The arrangement of a burner orifice control valve as disclosed in said patent eliminates considerable friction as of the valve needle guide 30 illustrated herein. The upper spring 25 would then be bowed against the outside of the needle mounting diaphragm. Many provisions for adjusting the maximum and minimum opening of the valve will occur to one skilled in the art and need not be discussed herein. This invention, therefore, is not limited to what is shown in the drawing and described in the specification but only as indicated in the following claims.

We claim:

1. In combination with a gas burner having a control valve, a pair of normally flat resilient strips mechanically connected at their ends and resiliently retained in oppositely bowed positions, one of said strips being operatively connected to said valve, and a thermostat operatively associated with the other of said strips.

2. In an automatic control device, a pair of normally flat resilient strips mechanically connected at their ends and resiliently retained in oppositely bowed positions, a control member operatively connected to one of said strips, and an expansible operating member operatively associated with the other of said strips.

3. An automatic control device comprising a pair of normally straight leaf springs mechanically connected at their ends and resiliently retained in oppositely bowed positions, a control valve operatively associated with one of said springs, and a thermostat operatively associated with the other of said springs.

4. In a gas burner having a needle type mixing valve, a pair of normally straight leaf springs mechanically connected at their ends, means for resiliently retaining said springs in oppositely bowed positions, the center of one of said springs being operatively associated with the needle of said mixing valve, and an expansible fluid thermostat arranged for expansion against the resistance of the other of said springs.

5. In a gas burner having a mixing chamber and a reciprocable valve for controlling admission of gas to said chamber, an expansible fluid thermostat, and motion transmitting means between said valve and said thermostat including a structure having two oppositely bent members connected together and resiliently mounted so that bending of one member causes a corresponding bending of the other member in the opposite direction, said valve being connected to one of said members and said thermostat being connected to the other of said members so that movement of said thermostat in one direction substantially along the axis of reciprocation of said valve causes a corresponding movement of said valve in the opposite direction.

6. In an automatic control device, a reciprocable control member, an operating element, and motion transmitting means between said control member and operating element including two bendable members connected together and resiliently mounted in oppositely bent positions so that bending of one member causes a corresponding bending of the other member in the opposite direction, said control member being connected to one of said bendable members and said operating element being connected to the other of said bendable members so that movement of said operating element in one direction substantially along the axis of reciprocation of said control member causes a corresponding movement of said control member in the opposite direction.

7. In an automatic control for use in a cooling device, a valve adapted to float between its fully open and fully closed positions and to move toward its closed position in response to a reduction in temperature, an expansible member, and a load spring for said member comprising a spring toggle, said load spring and expansible member being so connected that movement of said toggle is effected in a manner corresponding to the expansion and contraction of said member, the said valve, toggle and expansible member being operatively connected so that said valve always moves toward its open position as said member expands and said valve always moves toward its closed position as said member contracts, the force of said toggle being exerted constantly in the same general direction while said valve moves from its fully open to its fully closed position and constantly in a generally different direction as said valve moves from its fully closed to its fully open position, said toggle being arranged to effect a relatively greater mechanical advantage when the valve is near its fully open position and a lesser mechanical advantage when the valve is near its fully closed position.

8. A device as set forth in claim 7 in which said spring toggle comprises a metal strip resiliently held in a bowed position.

SVEN W. E. ANDERSSON.
IVAR TORNKVIST.